United States Patent
Rademacher et al.

(10) Patent No.: US 9,080,002 B2
(45) Date of Patent: *Jul. 14, 2015

(54) COATING COMPOSITION COMPRISING CALCIUM HYDROGEN-PHOSPHATE, PROCESSES FOR PREPARING IT, ITS USE AND SUBSTRATES COATED WITH IT

(75) Inventors: Josef Rademacher, Munster (DE); Gisela Laumann, Munster (DE); Heinz-Peter Rink, Munster (DE)

(73) Assignee: BASF Coatings GmbH, Munster (DE)

( * ) Notice: Subject to any disclaimer, the term of this patent is extended or adjusted under 35 U.S.C. 154(b) by 602 days.

This patent is subject to a terminal disclaimer.

(21) Appl. No.: 12/441,253

(22) PCT Filed: Sep. 14, 2007

(86) PCT No.: PCT/EP2007/008003
§ 371 (c)(1),
(2), (4) Date: Mar. 13, 2009

(87) PCT Pub. No.: WO2008/031603
PCT Pub. Date: Mar. 20, 2008

(65) Prior Publication Data
US 2009/0291220 A1    Nov. 26, 2009

(30) Foreign Application Priority Data

Sep. 14, 2006 (DE) .......................... 10 2006 044 035

(51) Int. Cl.
C08K 3/32 (2006.01)
B05D 1/36 (2006.01)
C08G 18/32 (2006.01)
C09D 5/08 (2006.01)

(52) U.S. Cl.
CPC ............ *C08G 18/3256* (2013.01); *C09D 5/084* (2013.01)

(58) Field of Classification Search
CPC ........................................................ C09D 5/084
USPC .............................. 427/385.5, 407.1; 524/417
See application file for complete search history.

(56) References Cited

U.S. PATENT DOCUMENTS

| 4,294,808 | A | * | 10/1981 | Wasel-Nielen et al. | ....... 423/305 |
| 5,214,086 | A | * | 5/1993 | Mormile et al. | ............. 524/237 |
| 5,665,149 | A | * | 9/1997 | Gotzmann et al. | ......... 106/14.12 |
| 5,977,246 | A | | 11/1999 | Fenn | |
| 6,297,320 | B1 | | 10/2001 | Tang et al. | |
| 6,359,059 | B1 | * | 3/2002 | Shepler et al. | ............... 524/590 |
| 2004/0096569 | A1 | * | 5/2004 | Barkalow et al. | ............. 426/660 |
| 2006/0047085 | A1 | * | 3/2006 | Trivedi | ........................ 525/329.7 |
| 2006/0198951 | A1 | | 9/2006 | Tang et al. | |
| 2007/0129527 | A1 | | 6/2007 | Griswold | |
| 2008/0223256 | A1 | | 9/2008 | Laumann et al. | |
| 2009/0291220 | A1 | | 11/2009 | Rademacher et al. | |

FOREIGN PATENT DOCUMENTS

| DE | 69702047 T2 | 10/2000 | |
| DE | 102005036630 B3 | 9/2006 | |
| DE | 102006044035 A1 | 3/2008 | |
| EP | 0008127 A1 | 2/1980 | |
| EP | 0009175 A1 | 4/1980 | |
| EP | 0028290 A1 | 5/1981 | |
| EP | 0249201 A2 | 12/1987 | |
| EP | 0276501 A2 | 8/1988 | |
| EP | 0296540 A2 | 12/1988 | |
| EP | 296540 A2 * | 12/1988 | ............... C09D 5/08 |
| EP | 0686654 A1 | 12/1995 | |
| EP | 0893458 A1 | 1/1999 | |
| WO | WO92/01023 A1 | 1/1992 | |
| WO | WO9712945 A1 | 4/1997 | |

OTHER PUBLICATIONS

Bayer MaterialScience, 2006, "Desmophen 650A 65", p. 1-2.*
Bayer MaterialScience, 2011, "Desmophen 650 MPA", p. 1-3.*
Kalenda et al., "Properties of anticorrsion pigments depending on their chemical composition and PVC value", Pigment & Resin Technology, 2006, vol. 35, No. 4, p. 188-199.*
Becker et al., DERWENT Abstract of EP 296540 A2, 1993.*
English Translation of Written Opinion for PCT/EP2007/008003 filed Sep. 14, 2007.
English Translation of International Preliminary Report on Patentability for PCT/EP2007/008003 dated Apr. 7, 2009.
International Search Report for PCT/EP2007/008003 dated Jan. 28, 2008.
Written Opinion for PCT/EP2007/008003 filed Sep. 14, 2007.
Co-Pending U.S. Appl. No. 12/933,287, filed Sep. 17, 2010.

(Continued)

*Primary Examiner* — Peter F Godenschwager
*Assistant Examiner* — David Karst
(74) *Attorney, Agent, or Firm* — Servilla Whitney LLC

(57) ABSTRACT

The abstract concerns a coating composition comprising 25-55% by weight of one or more film formers, 2.5-55% by weight of one or more fillers, 0-10% by weight of one or more additives, and 0-30% by weight of a solvent, based on the total weight of the coating composition. As the filler or a filler the composition comprises calcium hydrogen phosphate in a mass fraction of 2.5-20%, preferably 5-15%, more preferably 7.5-11% by weight based on the total weight of the coating composition. The invention further concerns processes for preparing this coating composition, its use as a coating material in the vehicle sector, and substrates produced therewith.

13 Claims, No Drawings

(56) References Cited

OTHER PUBLICATIONS

International Preliminary Report on Patentability for International Application No. PCT/EP2009/001956 issued Oct. 5, 2010.

International Search Report for International Application No. PCT/EP2009/001956 mailed Jul. 13, 2009.
Written Opinion for International Application No. PCT/EP2009/001956 mailed Jul. 13, 2009.

* cited by examiner

COATING COMPOSITION COMPRISING CALCIUM HYDROGEN-PHOSPHATE, PROCESSES FOR PREPARING IT, ITS USE AND SUBSTRATES COATED WITH IT

CROSS REFERENCE TO RELATED APPLICATIONS

This application is a National Phase Application of Patent Application PCT/EP2007/008003 filed on 14 Sep. 2007 which claims priority to DE 10 2006 044 035.8 filed 14 Sep. 2006.

FIELD OF THE INVENTION

The present invention relates to coating compositions comprising one or more film formers, one or more fillers, optionally one or more pigments, optionally one or more additives, and optionally a solvent. The invention also relates to processes for preparing these coating compositions, to their use as coating material in the vehicle sector, and to coated substrates produced with them.

BACKGROUND OF THE INVENTION

Coating compositions, particularly polyurethane coatings produced by reacting isocyanate-functional resins with hydroxyl-functional polyol resins, are well known per se. These coatings are distinguished, as is known, by a range of outstanding properties, including high durable adhesiveness and chemical resistance. On account of their good glamour properties they are outstandingly suitable for automotive applications and automotive refinish applications, and also for industrial applications. In comparison to aqueous compositions they exhibit substantially better drying times and an enhanced corrosion control. With these coatings, however, owing to the formation of hydrogen bonds and owing to the molecular weight of the main polymer chain, it is the polyol component that makes the greatest contribution to the overall viscosity of the coating, thereby restricting the freedom to incorporate other substances at formulation and to meet the specifications in terms of application solids content. The reduction in the molecular weight of the polyol leads ultimately to slow network construction, unless considerable quantities of energy are introduced.

Through the use of greater amounts of solvent it is indeed possible to reduce the overall viscosity of the coating and so to accelerate network construction, but using large amounts of solvent is environmentally objectionable. In particular, coating compositions with high proportions of volatile organic compounds, especially solvents (VOC), do not meet the provisions of guidelines in which the maximum VOC content is laid down. In this context, in the future, it will be necessary to realize VOC contents of not more than 250 g/l.

The properties of high-solids, polyol-containing polyurethane coatings can also be enhanced through the use of reactive diluents. One application of this technique has been demonstrated by U.S. Pat. No. 5,214,086. Described therein is the use of oligo-aldimines, oligoketimines and hindered oligoamines to modify polyol compositions, leading to a reduction in the viscosities of the mixtures with retention and often improvement in network construction and in the physical properties. The publication, however, is concerned only with the addition of pigments to the modified polyol composition, and not with the production of highly filled modified polyol compositions.

It is known, it is true, that these modified coating compositions can comprise fillers such as calcium sulfate, zinc phosphate, and barium sulfate, for example, which exhibit very good adhesion to a steel substrate, for example (EP 686 654; Detlef Gysau, Technologie des Beschichtens—Füllstoffe, Vincentz Verlag, ISBN 3-87870-793-2). On aluminum and on multimaterial substrates, however, both in the loaded and unloaded states of the substrate, these coating compositions display unsatisfactory adhesion. Moreover, the weathering behavior of these coating compositions is unacceptable. Adhesion to aluminum is typically obtained by an alternative route, through the use of chromate-containing fillers (Lückert, Pigment+Füllstofftabellen, Lückert Verlag, ISBN 3-927342-03-3; Glasurithandbuch 1984, Vincentz Verlag, ISBN 3-87870-192-6; Peter Volk in "Metalloberfläche", Sonderdruck May 2006). On account of the environmental pollution, however, the use of chromate for the purpose of achieving the desired properties ought to be abandoned.

SUMMARY OF THE INVENTION

It is an object of the invention, therefore, to develop high-solids coating compositions which comprise chromate-free fillers and which on aluminum and multimaterial substrates exhibit effective adhesion in both the loaded and the unloaded states. When exposed to weathering, the coating compositions ought to continue to show good properties. Finally, they ought to exhibit properties such as the mediation of sufficient corrosion control, satisfactory drying times, and sandability.

This object is achieved by means of a coating composition comprising 25-55% by weight of one or more film formers, 2.5-55% by weight of one or more fillers, 0-10%, preferably 0.1-10%, by weight of one or more additives, and 0-30%, preferably 1-30%, by weight of a solvent, based on the total weight of the coating composition, and comprising as the or a filler calcium hydrogen phosphate in a mass fraction of 2.5-20%, preferably 5-15%, more preferably 7.5-11% by weight based on the total weight of the coating composition. The coating composition may further contain 0-15%, preferably 0.01-15% by weight, based on the total weight of the coating composition, of one or more pigments.

DETAILED DESCRIPTION OF A PREFERRED EMBODIMENT

The coating compositions of the invention generally comprise a solvent. Coating compositions of the invention may instead of the solvents also comprise reactive diluents, which may likewise lead to a reduction in the viscosity.

These coating compositions adhere well to aluminum and multimaterial substrates, have good weathering properties, impart satisfactory corrosion control, dry rapidly, and exhibit good sandability.

The calcium hydrogen phosphate preferably has a particle size of 1.0 to 10.0 μm, more preferably 2.5-4.0 μm (measured with a Coulter Multisizer II). Use of particles with this size results in particularly smooth surfaces.

The film former preferably comprises a combination of at least one hydroxy-functional component, at least one aldimine and/or ketimine, and at least one polyisocyanate. These highly filled coating compositions display the positive properties generally known for polyurethane coatings, together with the desired effective adhesion to the stated substrates.

The hydroxy-functional component may comprise hydroxy-functional oils, such as esters of glycerol, for example, castor oil, and oils based on castor-oil fatty acid, and hydroxy-functional polymers which can be prepared by epoxidizing unsaturated oils, followed by polymer-analogous reactions involving opening of the oxirane ring, by means of monoalcohols or ethoxylated and/or propoxylated monoalcohols, for example. The weight fraction of the hydroxy-functional fatty acid, based on the hydroxyl contents of the hydroxy-functional component, is in this case preferably more than 60%, more preferably more than 80%, and very preferably more than 120%.

As 100%-form materials the hydroxy-functional components preferably have viscosities of less than 4500 mPas at 23° C. and glass transition temperatures of <0° C.

Preferred examples of commercial hydroxy-functional components are Desmophen 1150, Sovermol 818, Sovermol 805, Sovermol 750, Caspol 5009, Caspol 1938, and Caspol 1842.

With further preference the film former is a combination of a hydroxy-functional component, at least one ketimine, and at least one polyisocyanate. The use of ketimines rather than aldimines leads to significantly better water spray results, which can be ascertained, for example, by better degree-of-blistering values for the use of ketimines.

With particular preference the aldimine or ketimine used is the reaction product from the reaction of isophorone diamine with a corresponding aldehyde or ketone, respectively. These reaction products feature low viscosity and are therefore appropriate for use in the coating compositions of the invention.

The polyisocyanate used is preferably a polyisocyanate based on HMDI-, IPDI- or TMDI-, likewise exhibiting a low viscosity. Examples of corresponding commercial products include Desmodur 2410, Desmodur 3600 (both HMDI), and DesmodurXP2565 (IPDI). Particularly preferred polyisocyanates based on HMDI are asymmetric HMDI trimers, which are of particularly low viscosity.

The hydroxy-functional component is preferably a branched polyalcohol having ether groups and/or ester groups.

With preference the coating compositions of the invention comprise less than 540 g/l volatile organic compounds (VOC). With particular preference the coating compositions comprise less than 250 g/l VOC. On account of their low VOC contents they lead to environmental impairment only to a small degree.

The coating compositions may further comprise one or more adjuvants selected from 10 the group consisting of dispersants, rheological additives, antisettling agents, pigment stabilizers, fillers, and ceramic microspheres. Suitable additives are described in "Lackadditive" [Additives for coatings] by Johan Bieleman, (Wiley-Verlag, ISBN 3-527-28819-8) and also in "BASF-Handbuch—Lackiertechnik" by Artur Goldschmidt and Hans-Joachim Streiberger (Vincentz Verlag, ISBN 3-87870-324-4).

The invention also provides a process for preparing a composition of the invention, which involves mixing a composition comprising at least one hydroxy-functional component with a composition comprising at least one polyisocyanate. With further preference, in the course of said mixing, a further composition is mixed in that comprises the at least one aldimine and/or ketimine. The composition comprising the at least one hydroxy-functional component preferably also comprises the additive or additives.

The invention additionally provides for the use of the coating compositions of the invention as coating material in the vehicle sector. With preference the coating compositions of the invention are used as primers. The coating compositions of the invention can in this case be used either as primer under a basecoat film and a clearcoat film or else beneath a single-coat topcoat. Further preference is given in this context to the use of the coating compositions of the invention as a primer on aluminum, steel, plastics, and multimaterial substrates, i.e., substrates which consist of different materials. Examples of multimaterial substrates are, in particular in the automotive refinish sector, old paint finishes with areas sanded right down. Here, undefined metallic substrates (areas sanded right down) meet undefined polymeric substrates (old paint finish made up, for example of electrocoat, primer, basecoat, and clearcoat). Particular preference is given to use on aluminum or on a multimaterial substrate.

The invention likewise provides a coated substrate producible by coating a substrate with a coating composition of the invention and curing the coating. The coated substrate in question is preferably coated with the coating composition as a primer beneath a basecoat film and a clearcoat film or beneath a single-coat topcoat. With preference the substrate is aluminum, steel or plastic, or is a multimaterial substrate. With particular preference the substrate is aluminum or a multimaterial substrate.

EXAMPLES

Example 1

The following three compositions are prepared, with the stated values for the initial weight percentage amounts:
1. 15.5 branched polyalcohol having ether groups and ester groups (Desmophen® 1150)
   8.5 calcium hydrogen phosphate, particle size 2.5-4.0 μm (Heucophos® CHP)
   15.8 butyl acetate 98-100%
   1.0 Disperbyk 111
   0.4 Bentone 38
   0.4 Aerosil R 972
   0.3 Bayferrox 3910
   0.1 Flammenruβ 101 lamp black
   10.0 Luzenac 10 MO
   8.0 Silitin N 85
   15.0 Blanc Fixe N
   19.0 Tiona 595 titanium rutile
   6.0 Zeeospheres G 600
2. 80.0 ketimine (Desmophen® 2965)
   19.4 butyl acetate 98-100%
   0.6 benzoic acid D
3. 85.0 asymmetric HMDI trimer (Desmodur® XP 2410)
   15.0 butyl acetate 98-100%

The three compositions are mixed in a volume ratio of 2:1:1. The resulting coating composition is applied in two spray passes as a primer-surfacer to steel (CRS panels for metal bodywork sheet No. 18 from Meier & Co.), aluminum (AlMgSi AA6016, degreased, from Chemetall), and galvanized steel (Gardobond OG, degreased, electrolytically galvanized, from Chemetall) and subsequently dried in air with a relative humidity of 50% at 20° C. for an hour. This is followed by overcoating with a standard topcoat (e.g. 68 series from Glasurit®), which is dried at 60° C. for a period of 30 minutes.

In comparison with a similar coating composition differing only in the substitution of Heucophos ZPA (zinc phosphate) for Heucophos CHP (calcium hydrogen phosphate), the coated substrate shows satisfactory results in the water spray test and in the SS and ESS salt spray fog tests.

Example 2

The following three compositions are prepared, with the stated values for the initial weight percentage amounts:

1. 15.5 branched polyalcohol having ether groups and ester groups (Desmophen® 1150)
   16/5 calcium hydrogen phosphate, particle size 2.5-4.0 μm (Heucophos® CHP)
   15.8 butyl acetate 98-100%
   1.0 Disperbyk 111
   0.4 Bentone 38
   0.4 Aerosil R 972
   0.3 Bayferrox 3910
   0.1 Flammenruβ 101 lamp black
   6.0 Luzenac 10 MO
   4.0 Silitin N 85
   15.0 Blanc Fixe N
   19.0 Tiona 595 titanium rutile
   6.0 Zeeospheres G 600
2. 80.0 ketimine (Desmophen® 2965)
   19.4 butyl acetate 98-100%
   0.6 benzoic acid D
3. 85.0 asymmetric HMDI trimer (Desmodur® XP 2410)
   15.0 butyl acetate 98-100%

The three compositions are mixed in a volume ratio of 2:1:1. The resulting coating composition is applied in two spray passes as a primer-surfacer to steel (CRS panels for metal bodywork sheet No. 18 from Meier & Co.), aluminum (AlMgSi AA6016, degreased, from Chemetall), and galvanized steel (Gardobond OG, degreased, electrolytically galvanized, from Chemetall) and subsequently dried in air with a relative humidity of 50% at 20° C. for an hour. This is followed by overcoating with a standard topcoat, which is dried at 60° C. for a period of 30 minutes.

In comparison with a similar coating composition differing only in the substitution of Heucophos ZPA (zinc phosphate) for Heucophos CHP (calcium hydrogen phosphate), the coated substrate shows very satisfactory results in the water spray test and in the SS and ESS salt spray fog tests.

Tests:
Water Spray Test
Specification: based on DIN 50 907 section 3.1
Test apparatus: corrosion test apparatus, in-house construction
Test room temperature: room temperature, 18-28° C.
Test room ventilation: forced-air operation
Test room acclimatization: aerosol generator (Defensor 3001)
Humidity regulation: none
Test cycle: 5 minutes spray phase
   55 minutes rest phase
Test duration: at least 24 hours
Salt Spray Fog Test SS
Specification: DIN 50 021-SS
Test instrument: corrosion test instruments to DIN 50 021:
   SL 2000 and SL 2000 from Liebisch
   VSNK 1500 S from Heraeus-Vötsch
Test room temperature: 35±2° C. continuously
Test cycle: spraying of aqueous NaCl solution
Test parameters: NaCl concentration of precipitate=50±5 g/l
   pH of precipitate=6.5-7.2 (at 23±2° C.)
   precipitate volume=1.5±0.5 ml/h*80 cm$^2$
Test duration: 24 hours/day
Salt Spray Fog Test ESS
Specification: DIN 50 021-ESS
Test instrument: corrosion test instruments to DIN 50 021:
   SL 2000 and SL 2000 from Liebisch
Test room temperature: 35±2° C. continuously
Test cycle: spraying of aqueous NaCl solution, acidified with acetic acid
Test parameters: NaCl concentration of precipitate=50±5 g/l
   pH of precipitate=3.1-3.3 (at 23±2° C.)
   precipitate volume=1.5±0.5 ml/h*80 cm$^2$
Test duration: 24 hours/day
Scratch Test:
Relative scale from 1-10, 1=poorest, 10=best
Topcoat Holdout
Relative scale from 1-10, 1=poorest, 10=best
Test Results:

|  | Example 1 | Reference 1 | Example 2 | Reference 2 |
|---|---|---|---|---|
| Substrate DIN A 4 panels | | | | |
| Film thickness F | 65 μm | 75 μm | 75 μm | 70 μm |
| Film thickness DL | 65 μm | 55 μm | 55 μm | 50 μm |
| Topcoat holdout | 7 | 7 | 7 | 7 |
| Scratch test | K0 | K0 | K0 | K0 |
| Cross-cut (ISO 2409) | 0/0 | 0/0 | 0/0 | 0/0 |
| Stone-chip (DIN 55996) | 2 | 2 | 2 | 2.5 |
| Water spray test 240 h | | | | |
| Degree of blistering (DIN 53209) | m1g1 | m1g1 | m1g1 | m1g1 |
| GT after 1 h | 0/0 | 0/0 | 0/0 | 0/0 |
| GT after 24 h | 0/0 | 0/0 | 0/0 | 0/0 |
| Salt spray test 480 h | | | | |
| Scribe creep vis. | 5 | 12 | 4 | 3 |
| Scribe creep 1 h | 9 | 12 | 10 | 6 |
| Scribe creep 24 h | 8 | 10 | 7 | 2 |
| GT after 1 h | 0/0 | 0/0 | 0/0 | 0/0 |
| GT after 24 h | 0/0 | 0/0 | 0/0 | 0/0 |
| Substrate AlMg Si 1.0 | | | | |
| Scratch test | K1 | K5 | K0 | K5 |
| Cross-cut | 0/0 | 2/1 | 0/0 | 5/— |
| Stone-chip | 2.5 | 3.5 | 2 | 4.0 |
| Water spray test 240 h | | | | |
| Degree of blistering | m1g1 | m2g1 | m1g1 | m3g2 |
| GT after 1 h | 3/3 | 5/— | 0/0 | 5/— |
| GT after 24 h | 0/0 | 3/2 | 0/0 | 5/— |
| Salt spray test 480 h | | | | |
| Scribe creep vis. | 4 | 7 | 1 | 20 |
| Scribe creep 1 h | 4 | 9 | 1.5 | all |
| Scribe creep 24 h | | 7 | | all |
| GT after 1 h | 2/0 | 5/— | 1/0 | 5/— |
| GT after 24 h | 2/0 | 3/1 | 1/0 | 5/— |
| Substrate galvanized | | | | |
| Scratch test | K0 | K1 | K0 | K1 |
| Cross-cut | 0/0 | 0/0 | 0/0 | 0/0 |
| Stone-chip | 2 | 2.0 | 2 | 2.0 |
| Water spray test 240 h | | | | |
| Degree of blistering | m1g1 | m1g1 | m1g1 | m2g1 |
| GT after 1 h | 0/0 | 0/0 | 0/0 | 0/0 |
| GT after 24 h | 0/0 | 0/0 | 0/0 | 0/0 |
| Salt spray test 480 h | | | | |
| Scribe creep vis. | 8 | 7 | 10 | 6 |
| Scribe creep 1 h | 6 | 7 | 7 | 6 |
| Scribe creep 24 h | | 7 | | 6 |
| GT after 1 h | 0/0 | 0/0 | 0/0 | 0/0 |
| GT after 24 h | 0/0 | 0/0 | 0/0 | 0/0 |

What is claimed is:

1. A coating composition comprising:
   25-55% by weight of one or more film formers comprising a combination of at least one hydroxy-functional component, at least one aldimine and/or ketimine, and at least one polyisocyanate,
   2.5-55% by weight of one or more fillers wherein at least one filler comprises calcium hydrogen phosphate in a mass fraction of 2.5 to 20% based on the total weight of the coating composition wherein the calcium hydrogen phosphate has an average particle size of 2.5 to 4.0 μm,
0-10% by weight of one or more additives, and
1-30% by weight of a solvent, based on the total weight of the coating composition, wherein the coating composition comprises less than 540 g/l volatile organic compounds (VOC).

2. The coating composition of claim 1, wherein as film former a combination of at least one hydroxy-functional component, at least one ketimine, and at least one polyisocyanate is present.

3. The coating composition of claim 1, wherein the at least one aldimine or ketimine comprises the reaction product of isophorone diamine with a corresponding aldehyde or ketone, respectively.

4. The coating composition of claim 1, wherein the at least one polyisocyanate comprises a polyisocyanate based on at least one of hexamethylene diisocyanate, isophorone diisocyanate or trimethyl hexamethylene diisocyanate.

5. The coating composition of claim 4, wherein the at least one polyisocyanate comprises a polyisocyanate based on an asymmetric hexamethylene diisocyanate trimer.

6. The coating composition of claim 1, wherein the at least one hydroxy-functional component comprises a branched polyalcohol having ester groups, ether groups, or a combination thereof.

7. The coating composition of claim 1, comprising less than 250 g/l volatile organic compounds (VOC).

8. The coating composition of claim 1, further comprising one or more additives selected from the group consisting of dispersants, rheological additives, antisettling agents, pigment stabilizers, fillers, and ceramic microspheres.

9. A coating composition comprising:
25-55% by weight of one or more film formers comprising a combination of at least one hydroxy-functional component, at least one aldimine and/or ketimine, and at least one polyisocyanate,
2.5-55% by weight of one or more fillers wherein at least one filler comprises calcium hydrogen phosphate in a mass fraction of 7.5 to 11% based on the total weight of the coating composition wherein the calcium hydrogen phosphate has an average particle size of 2.5 to 4.0 μm,
0-10% by weight of one or more additives, and
1-30% by weight of a solvent, based on the total weight of the coating composition, wherein the coating composition comprises less than 540 g/l volatile organic compounds (VOC).

10. A coating composition comprising:
25-55% by weight of one or more film formers comprising a combination of at least one hydroxy-functional component, at least one aldimine and/or ketimine, and at least one polyisocyanate, wherein the at least one hydroxy-functional component comprises a branched polyalcohol having ester groups, ether groups, or a combination thereof,
2.5-55% by weight of one or more fillers wherein at least one filler comprises calcium hydrogen phosphate in a mass fraction of 7.5 to 11% based on the total weight of the coating composition wherein the calcium hydrogen phosphate has an average particle size of 2.5 to 4.0 μm,
0-10% by weight of one or more additives, and
1-30% by weight of a solvent, based on the total weight of the coating composition, wherein the coating composition comprises less than 540 g/l volatile organic compounds (VOC).

11. A coated substrate comprising: a coating, the coating being produced by a coating composition comprising
25-55% by weight of one or more film formers comprising a combination of at least one hydroxy-functional component, at least one aldimine and/or ketimine, and at least one polyisocyanate,
2.5-55% by weight of one or more fillers wherein at least one filler comprises calcium hydrogen phosphate in a mass fraction of 2.5 to 20% based on the total weight of the coating composition wherein the calcium hydrogen phosphate has an average particle size of 2.5 to 4.0 μm,
0-10% by weight of one or more additives, and
1-30% by weight of a solvent, based on the total weight of the coating composition, wherein the coating composition comprises less than 540 g/l volatile organic compounds (VOC); and
a substrate comprising aluminum.

12. A coated substrate comprising:
a coating, the coating being produced by a coating composition comprising
25-55% by weight of one or more film formers comprising a combination of at least one hydroxy-functional component, at least one aldimine and/or ketimine, and at least one polyisocyanate, wherein the at least one hydroxy-functional component comprises a branched polyalcohol having ester groups, ether groups, or a combination thereof,
2.5-55% by weight of one or more fillers wherein at least one filler comprises calcium hydrogen phosphate in a mass fraction of 7.5 to 11% based on the total weight of the coating composition wherein the calcium hydrogen phosphate has an average particle size of 2.5 to 4.0 μm,
0-10% by weight of one or more additives, and
1-30% by weight of a solvent, based on the total weight of the coating composition, wherein the coating composition comprises less than 540 g/l volatile organic compounds (VOC); and
a substrate comprising aluminum.

13. The coating composition of claim 1, wherein the at least one filler comprises calcium hydrogen phosphate in a mass fraction of 7.5 to 20% based on the total weight of the coating composition.

* * * * *